US008087880B2

(12) United States Patent
Karafillis et al.

(10) Patent No.: US 8,087,880 B2
(45) Date of Patent: Jan. 3, 2012

(54) ACTIVE CLEARANCE CONTROL FOR A CENTRIFUGAL COMPRESSOR

(75) Inventors: Apostolos Pavlos Karafillis, Winchester, MA (US); Kenneth Allen Loehle, Lynn, MA (US); Robert Patrick Tameo, Peabody, MA (US); David Allen Gutz, Danvers, MA (US)

(73) Assignee: General Electric Company, Schenectady, NY (US)

( * ) Notice: Subject to any disclaimer, the term of this patent is extended or adjusted under 35 U.S.C. 154(b) by 681 days.

(21) Appl. No.: 12/327,266

(22) Filed: Dec. 3, 2008

(65) Prior Publication Data

US 2011/0002774 A1 Jan. 6, 2011

(51) Int. Cl.

| | |
|---|---|
| ***F01B 25/26*** | (2006.01) |
| ***F01D 25/00*** | (2006.01) |
| ***F01D 25/24*** | (2006.01) |
| ***F03B 11/00*** | (2006.01) |
| ***F03B 11/02*** | (2006.01) |
| ***F03D 11/00*** | (2006.01) |
| ***F04D 29/00*** | (2006.01) |

(52) U.S. Cl. .......... 415/118; 415/1; 415/127; 415/174.1

(58) Field of Classification Search .............. 415/1, 118, 415/127, 174.1

See application file for complete search history.

(56) References Cited

U.S. PATENT DOCUMENTS

| | | | | |
|---|---|---|---|---|
| 4,264,271 | A | 4/1981 | Libertini | |
| 5,101,165 | A * | 3/1992 | Rickards | 324/662 |
| 5,203,673 | A * | 4/1993 | Evans | 415/173.2 |
| 5,555,721 | A | 9/1996 | Bourneuf et al. | |
| 6,273,671 | B1 * | 8/2001 | Ress, Jr. | 415/1 |
| 7,215,252 | B2 * | 5/2007 | Schenck | 340/686.1 |
| 7,575,409 | B2 * | 8/2009 | Dierksmeier et al. | 415/1 |
| 7,909,566 | B1 * | 3/2011 | Brostmeyer | 415/34 |
| 2006/0213202 | A1 | 9/2006 | Fukutani | |
| 2008/0134659 | A1 | 6/2008 | Schwarz et al. | |

* cited by examiner

*Primary Examiner* — David S Blum

(74) *Attorney, Agent, or Firm* — William Scott Andes; Steven J. Rosen

(57) ABSTRACT

Apparatus and method of operating a centrifugal compressor and active control system includes a centrifugal compressor with compressor blades mounted on an impeller, an annular cavity bounded in part by a shroud adjacent to the blades, and an active control system for controlling a clearance between the shroud and the blades by controlling a cavity pressure in the cavity. An electronic controller for controlling a control pressure valve for pressurizing using a source of compressor discharge pressure air and depressurizing the cavity respectively may open and close the valves using pulse width modulation. Pressure and clearance sensors positioned for measuring the cavity pressure the blade tip clearance respectively in signal supply communication with the electronic controller may be used. The shroud may be supported by radially spaced apart annular radially outer and inner supports connected to a casing by a bolted joint bounding the cavity.

57 Claims, 6 Drawing Sheets

ACTIVE CLEARANCE CONTROL FOR A CENTRIFUGAL COMPRESSOR

GOVERNMENT INTERESTS

The government may have rights in this invention pursuant to government contract W911W6-07-2-0002 awarded by the Department of Defense.

TECHNICAL FIELD

The present invention relates generally to gas turbine engines having centrifugal compressors and, more specifically, to control of clearances between an impeller and a shroud of a centrifugal compressor.

BACKGROUND INFORMATION

Conventional gas turbine engines having centrifugal compressors typically have an axial cold clearance between the impeller and the impeller shroud set such that a rub between them will not occur at the operating conditions that will cause the highest clearance closure which is typically a cold burst. Active clearance control systems have been developed to control radial turbine clearances between tips of axial flow radially extending turbine and compressor blades and shrouds surrounding the blades. Typically, these active clearance control systems are thermally activated and use relatively cold or hot air or a combination of both from the fan, different compressor stages, or compressor discharge air to thermally cool or heat turbine or compressor shrouds or shroud support structures or casings in order to reduce the operating radial clearances. Controlling radial turbine clearances between tips of axial flow radially extending turbine and compressor blades and shrouds surrounding the blades increases fuel efficiency and reduces wear on the blades due to rubs.

It is known in the art to minimize clearance between the blade tips of an impeller rotating within a gas turbine engine and a surrounding blade tip shroud to reduce leakage of a working fluid around the blade tips of centrifugal compressor stages. Several actuation systems for adjusting blade tip clearance during engine operation have been developed. These systems often include complicated linkages, contribute significant weight, and/or require a significant amount of power to operate. Thus, there continues to be a demand for advancements in blade clearance technology to decrease impeller tip clearance thus causing an increase in overall compressor efficiency.

BRIEF DESCRIPTION OF THE INVENTION

A gas turbine engine centrifugal compressor and active control system assembly includes a centrifugal compressor having a plurality of centrifugal compressor blades mounted on an annular centrifugal compressor impeller, an annular blade tip shroud adjacent to blade tips of the blades, a substantially sealed annular cavity bounded in part by the annular blade tip shroud, and an active control system for controlling an annular blade tip clearance between the annular blade tip shroud and the blade tips by controlling a cavity pressure in the cavity.

An exemplary embodiment of the assembly includes valving controlled by an electronic controller for pressurizing and depressurizing the cavity. The valving is operably connected to a source of compressor discharge pressure air for pressurizing the cavity and may include a control pressure valve for pressurizing the cavity and depressurizing the cavity. The control pressure valve may be connected to the source of compressor discharge pressure air and to a vent line. An electronic controller may be controllably connected to the control pressure valve. The electronic controller may be operable for pulsing a solenoid of the control pressure valve many times a second for rapidly cycling the valves between open and closed states using pulse width modulation.

The assembly may further include one or more pressure sensors positioned for measuring the cavity pressure, one or more clearance sensors positioned for measuring the blade tip clearance, and the pressure and clearance sensors in signal supply communication with the electronic controller.

The assembly may further include the shroud supported by radially spaced apart annular impeller shroud radially outer and inner supports connected to a casing, the cavity bounded by the outer and inner supports and the annular blade tip shroud, and the radially outer and inner supports attached to radially outer and inner ends of the shroud respectively. The radially outer and inner supports may be connected to the casing by a bolted joint.

The assembly may further include axial stop pads extending radially outwardly from the radially outer end of and distributed circumferentially about the shroud of the stop pads.

An alternative embodiment of the active control system assembly includes a control pressure valve for pressurizing the cavity and a blow off pressure valve for depressurizing the cavity. The control and blow off pressure valves may be inline and connected to a pressure line extending between the cavity and the source of compressor discharge pressure air. An electronic controller may be controllably connected to the control and blow off pressure valves. The electronic controller may be operable for pulsing solenoids of the control and blow off pressure valves many times a second for rapidly cycling the valves between open and closed states using pulse width modulation.

A method for controlling the annular blade tip clearance includes controlling the cavity pressure with the active control system. The method may further include valving a source of compressor discharge pressure air for increasing the cavity pressure in the cavity and using a control pressure valve for the increasing of the cavity pressure in the cavity and for decreasing the cavity pressure in the cavity. The electronic controller may be used for controlling the control pressure valve for the controlling of the cavity pressure by opening and closing the control pressure valve for pressurizing the cavity with the source of compressor discharge pressure air and alternatively closing the control pressure valve for depressurizing the cavity with a pressure sink.

The method may further include pulsing a solenoid in the control pressure valve for opening and closing the control pressure valve many times a second for rapidly cycling the valve between open and closed states for the controlling of the cavity pressure using pulse width modulation for the pulsing of the solenoid. The method may further include measuring the cavity pressure using one or more pressure sensors positioned for measuring the cavity pressure and in signal supply communication with the electronic controller, measuring the blade tip clearance using one or more clearance sensors positioned for measuring the blade tip clearance and in signal supply communication with the electronic controller, and using output from the pressure and clearance sensors to the electronic controller for further controlling the control pressure valve for the controlling of the cavity pressure.

An alternative method for controlling the annular blade tip clearance includes using a control pressure valve for increasing the cavity pressure in the cavity and using a blow off pressure valve for decreasing the cavity pressure in the cavity. The electronic controller may be used for controlling the control and blow off pressure valves for the controlling of the cavity pressure by opening and closing the control pressure valve for pressurizing the cavity with the source of compressor discharge pressure air and alternatively opening and closing the blow off pressure valve for depressurizing the cavity with a pressure sink.

The method may further include pulsing solenoids in the control and blow off pressure valves for opening and closing the control and blow off pressure valves many times a second for rapidly cycling the valves between open and closed states for the controlling of the cavity pressure using pulse width modulation for the pulsing of the solenoids. The method may further include measuring the cavity pressure using one or more pressure sensors positioned for measuring the cavity pressure and in signal supply communication with the electronic controller, measuring the blade tip clearance using one or more clearance sensors positioned for measuring the blade tip clearance and in signal supply communication with the electronic controller, and using output from the pressure and clearance sensors to the electronic controller for further controlling the control and blow off pressure valves for the controlling of the cavity pressure.

DETAILED DESCRIPTION OF THE INVENTION

Figure 1:
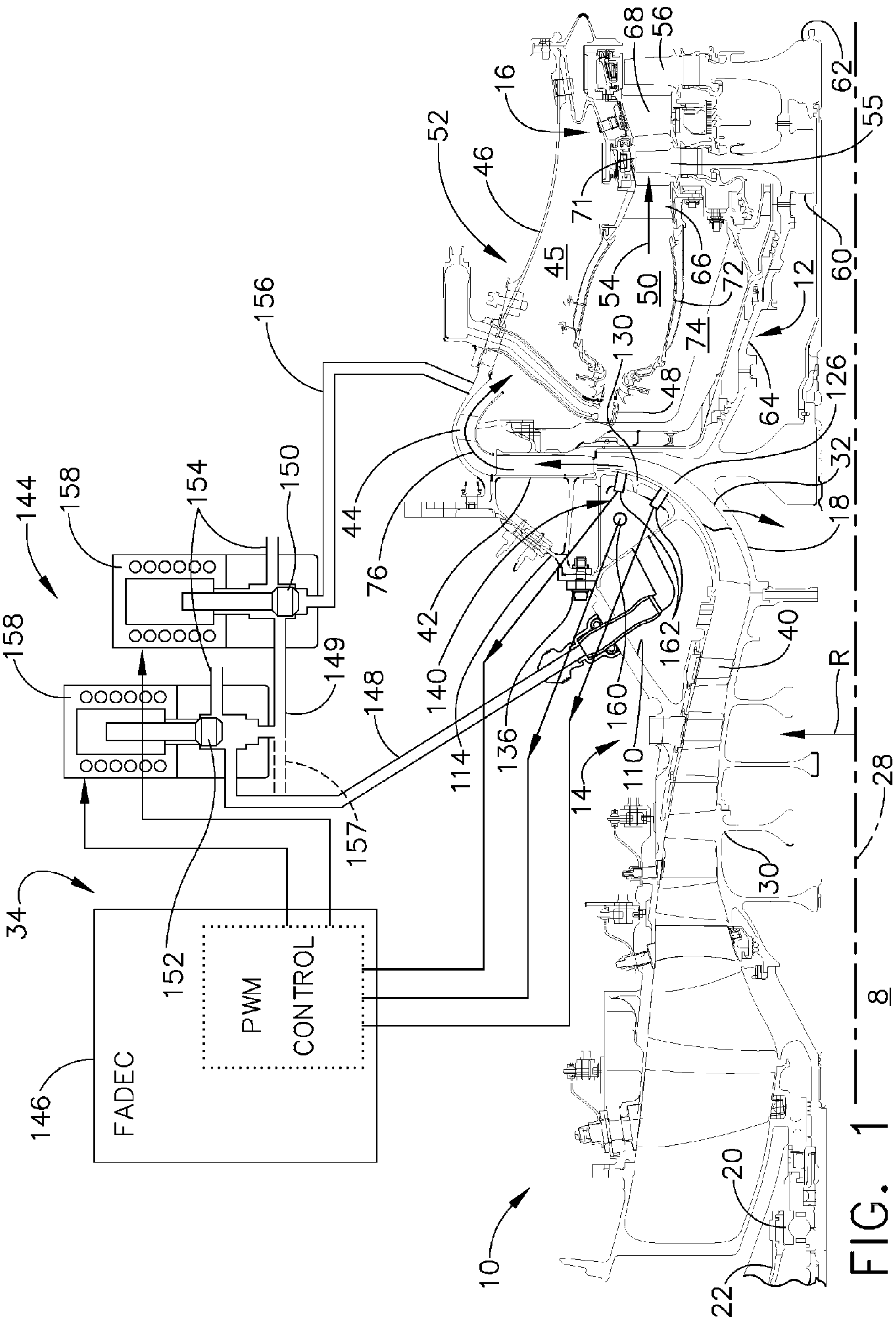
FIG. 1 is a schematic and sectional illustration of a gas turbine engine high pressure gas generator with active clearance control for a centrifugal compressor in the gas generator.

Illustrated in FIG. 1 gas turbine engine 8 with a high pressure gas generator 10 having a single stage centrifugal compressor 18 as a final compressor stage and an active control system 34 for controlling clearances or gaps in the centrifugal compressor 18. The high pressure gas generator 10 has a high pressure rotor 12 including, in downstream flow relationship of a high pressure compressor 14, a combustor 52, and a high pressure turbine 16. The rotor 12 is rotatably supported about an engine centerline 28 by a forward bearing 20 in a front frame 22 and a rear bearing (not shown) disposed downstream of turbine 16 in a turbine frame (not shown).

In the exemplary embodiment illustrated herein, the compressor 14 is a five stage axial compressor 30 followed by the single stage centrifugal compressor 18 having an annular centrifugal compressor impeller 32. Outlet guide vanes 40 are disposed between the five stage axial compressor 30 and the single stage centrifugal compressor 18. Compressor discharge pressure (CDP) air 76 exits the impeller 32 and passes through a diffuser 42 and then through a deswirl cascade 44 into a combustion chamber 45 within the combustor 52 surrounded by a combustor casing 46 where it is conventionally mixed with fuel provided by a plurality of fuel nozzles 48 and ignited in an annular combustion zone 50 bounded by the combustor 52. Resulting hot combustion gases 54 flow through the turbine 16 causing rotation of the high pressure rotor 12 and continue downstream for further work extraction in a low pressure turbine (not shown) and final exhaust as is conventionally known. In the exemplary embodiment depicted herein, the high pressure turbine 16 includes, in downstream serial flow relationship, first and second high pressure turbine stages 55, 56 having first and second stage disks 60, 62. A forward shaft 64 connects the high pressure turbine 16 in rotational driving engagement to the impeller 32. First and second stage nozzles 66, 68 are directly upstream of the first and second high pressure turbine stages 55, 56, respectively. Disposed radially inwardly from inner wall 72 of combustor casing 46 is annular cavity 74 which extends radially from wall 72 to the forward shaft 64.

Figure 2:
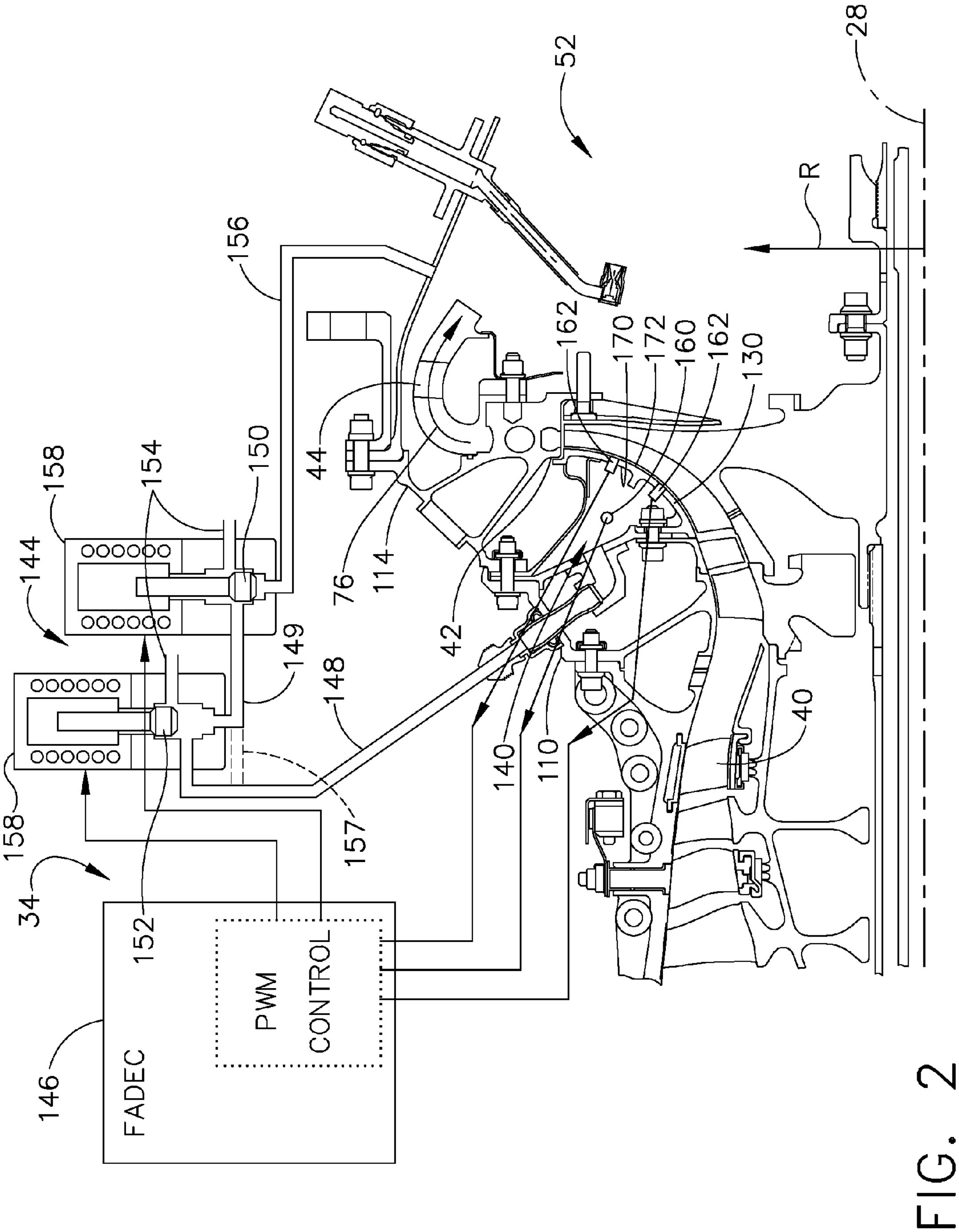
FIG. 2 is an enlarged schematic and sectional illustration of the centrifugal compressor and an active clearance control system illustrated in FIG. 1.

Referring to FIG. 2, the compressor discharge pressure (CDP) air 76 is discharged from the impeller 32 of the centrifugal compressor 18 and used to combust fuel in the combustor 52 and to cool components of turbine 16 subjected to the hot combustion gases 54; namely, the first stage nozzle 66, a first stage shroud 71 and the first stage disk 60. The compressor 14 includes a forward casing 110 and an aft casing 114. The forward casing 110 generally surrounds the axial compressor 30 and the aft casing 114 generally surrounds the centrifugal compressor 18 and supports the diffuser 42 directly downstream of the centrifugal compressor 18. The compressor discharge pressure (CDP) air 76 is discharged from the impeller 32 of the centrifugal compressor 18 directly into the diffuser 42.

Figure 3:
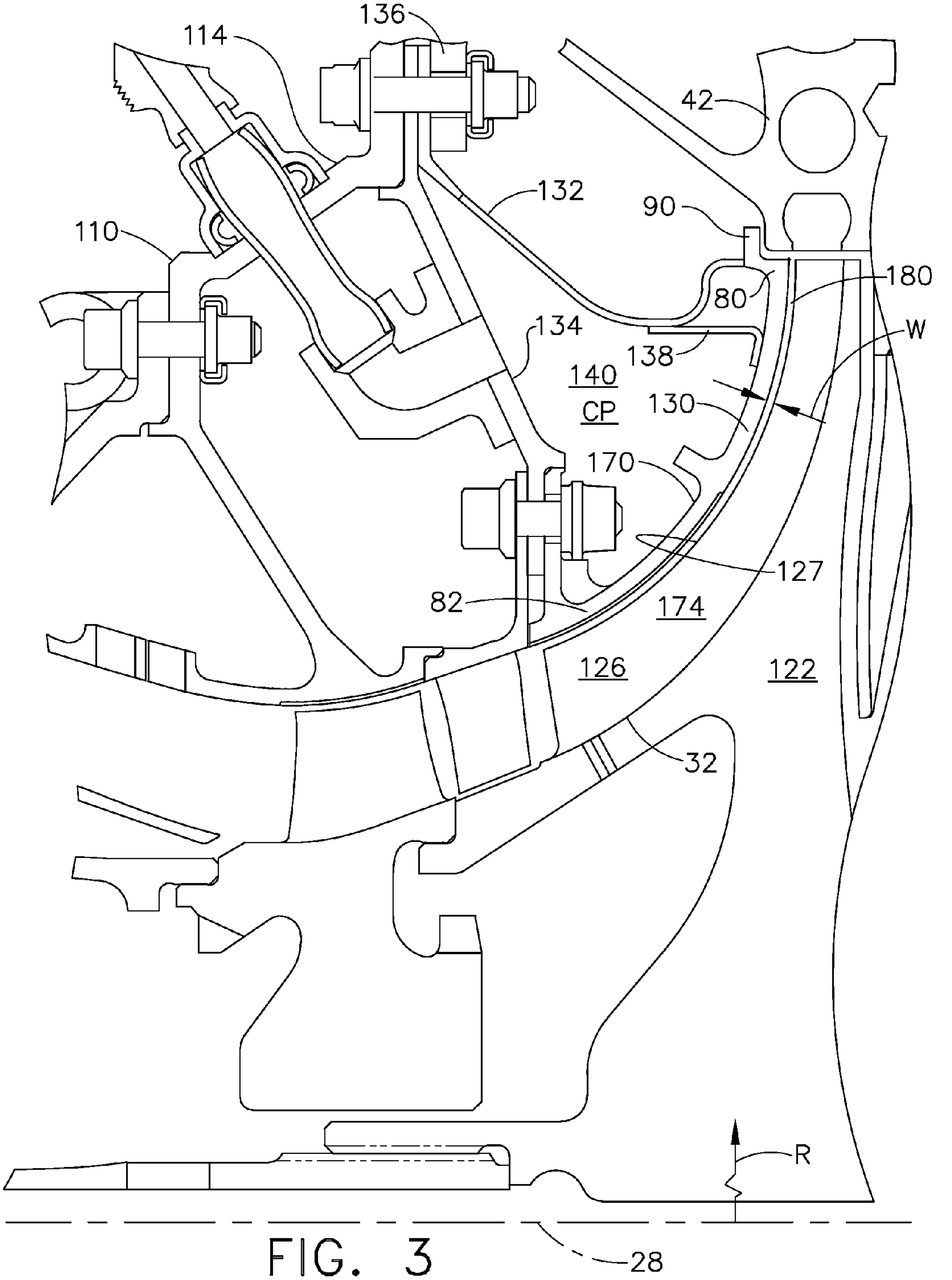
FIG. 3 is an enlarged sectional illustration of the centrifugal compressor illustrated in FIG. 1.

Referring to FIGS. 2 and 3, the impeller 32 includes a plurality of centrifugal compressor blades 126 radially extending from rotor disc portion 122. Opposite and axially forward of the blades 126 is an annular blade tip shroud 130. The shroud 130 is adjacent to blade tips 127 of the blades 126 defining an annular blade tip clearance 180 therebetween. The blade tip clearance 180 varies in axial width W in a radial direction R as measured from the engine centerline 28. It is desirable to minimize the blade tip clearance 180 during the engine operating cycle and avoid or minimize rubs between the shroud 130 and the blade tips 127 of the blades 126, particularly, during engine accelerations such as during cold bursts.

To this end, the active control system 34 was developed. The shroud 130 is supported by radially spaced apart annular impeller shroud radially outer and inner supports 132, 134 which are both connected by a bolted joint 136 to the aft casing 114. The radially outer and inner supports 132, 134 are attached such as by brazing to radially outer and inner ends 80, 82 of the shroud 130 respectively. A substantially sealed annular cavity 140 is thus formed between the shroud 130 and the radially outer and inner supports 132, 134. The radially outer support 132 is substantially thinner and more flexible than the radially inner support 134 and acts as a flexible element that allows the shroud 130 to flex or rotate about the bolted joint 136 and also seals the cavity 140. An annular stiffener 138 extending between and connected to the radially outer support 132 and the shroud 130 stiffens the assembly with respect to modal response and, therefore, prevents resonance of the shroud 130 during engine operation. Axial stop pads 90 extend radially outwardly from the radially outer end 80 of and are distributed circumferentially about the shroud 130. The axial stop pads 90 are designed to prevent accidental rubs between the shroud 130 and the impeller 32.

The exemplary embodiment of the active control system 34 illustrated in FIGS. 1-3 controls a cavity pressure CP in the cavity 140 using valving 144 controlled by an electronic controller 146 to pressurize the cavity 140 with compressor discharge pressure CDP of the CDP air 76 discharged from the impeller 32 and venting the cavity 140 to ambient pressure. The valving 144 utilizes a control pressure valve 150 connected by a pressure line 156 to the combustor 52 as a source of high pressure and a vent line 154 to ambient as a source of low pressure or a low pressure sink. The control pressure valve 150 is illustrated as being inline with an optional blow off valve 152 between the cavity 140 and the combustor 52. A cavity line 148 connects the cavity 140 and the control pressure valve 150 through the blow off valve 152 and an intermediate line 149 and is used to supply pressure to or vent the cavity 140. Alternatively, a bypass line 157, illustrated in dashed line, may be used to bypass the blow off valve 152 to connect cavity line 148 and the control pressure valve 150. In either embodiment the optional blow off valve 152 remains in a closed position during normal engine operation if it is incorporated in the active control system 34.

The control pressure valve 150 is used to increase and decrease the cavity pressure CP in the cavity 140 with pressure of the CDP air 76. The blow off pressure valve 152 is optional and is used blow off the cavity 140 in the event of an active control system 34 failure and is controlled independently. The control and blow off pressure valves 150, 152 illustrated herein are three way solenoid valves having three ports opened and closed by solenoid powered poppets. The ports are connected to the cavity 140 by the cavity line 148, to the pressure of the CDP air 76 in the combustor 52 by the pressure line 156, and to the ambient pressure by the vent line 154.

Operation of the control and blow off pressure valves 150, 152 are controlled by the electronic controller 146 which can be part of an electronic engine controller such as a full authority digital engine control (FADEC). The electronic controller 146 connected to the control and blow off pressure valves 150, 152 and operable for signalling valves to open and close. The electronic controller 146 may use input from one or more pressure sensors 160 positioned for measuring the cavity pressure CP and one or more clearance sensors 162 positioned for measuring the blade tip clearance 180 between the shroud 130 and the blade tips 127 of the blades 126. The control and blow off pressure valves 150, 152 may be electrically powered by solenoids 158 in the valves as illustrated herein.

The electronic controller 146 pulses the solenoid 158 of the control pressure valve 150 many times a second so as to rapidly cycle between open and closed positions or states. When the control pressure valve 150 is in the open position the cavity 140 is connected to the compressor discharge pressure CDP in the combustor 52. When the control pressure valve 150 is in the closed position the cavity 140 is connected through the vent line 154 to ambient pressure or some other low pressure source or sink.

Figure 4:
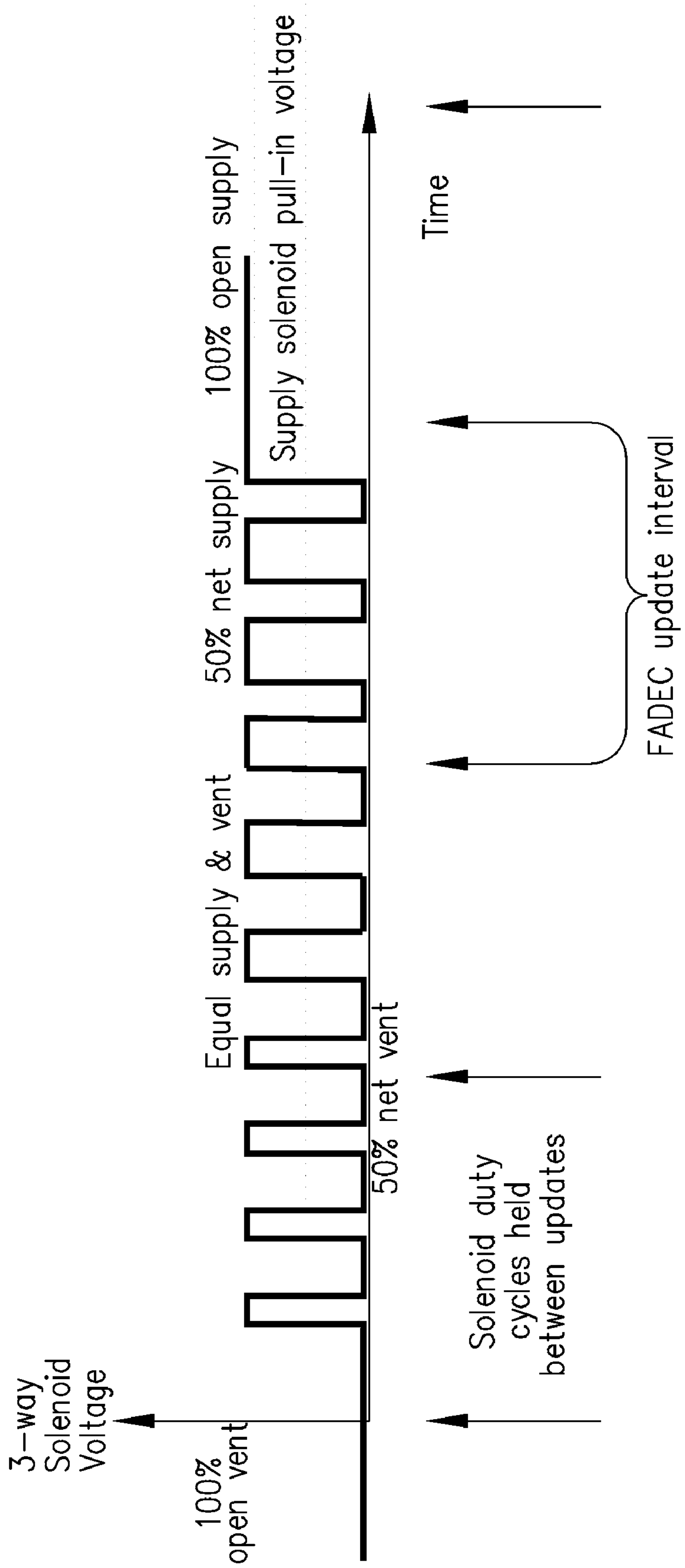
FIG. 4 is a graphic illustration of logic for operating a pulse width modulation valve in the active clearance control system illustrated in FIG. 2.

Referring to FIG. 4, pulse width modulation (PWM) is used by electronic controller 146 to control pulsing of the solenoid 158 of the control pressure valve 150 many times a second so as to rapidly cycle between open and closed states. Frequency of voltage pulses applied to the solenoids 158 is kept constant during a duty cycle but may be varied during different duty cycles depending on engine operating conditions such as take off, landing, and cruise. The amount of pressure by which the cavity 140 is pressurized or depressurized is a non-linear function of the duty cycle (i.e., the ratio of time that current is applied to the solenoid to the period) and the pressure differential across the valve. Although pulse width modulation, wherein the pulse frequency is held constant and only the pulse width is varied, is the exemplary method of operation illustrated herein, pulse ratio modulation, wherein both pulse width and frequency are variables, may also be employed. Thus, to pressurize the cavity 140 the pulse width in the open state is greater than the pulse width in the closed sate as illustrated by the 50% net supply and 50% net vent pulses respectively in FIG. 4.

Referring back to FIG. 3, raising the cavity pressure CP in the cavity 140 with pressure of the CDP air 76 causes the shroud 130 to move closer to the blade tips 127 of the blades 126, thus, decreasing the annular blade tip clearance 180 between the shroud 130 and the blade tips 127. This happens because a surface averaged pressure on a forward facing surface 170 of the shroud 130 produces greater than a surface averaged pressure over on an aft facing surface 172 of the shroud 130 exposed to a radially increasing impeller pressure 174 of the impeller 32 during engine operation.

Thus, the active control system 34 using CDP air pressure will decrease the annular blade tip clearance 180 between the shroud 130 and the blade tips 127 from its non-pressure augmented amount. The non-pressure augmented amount is the amount of the blade tip clearance 180 when no pressure is either being supplied to or bled from the cavity 140 by the active control system 34. Alternatively, a secondary supply of pressure substantially lower than the impeller pressure 174 can be used to increase the annular blade tip clearance 180 between the shroud 130 and the blade tips 127 from its non-pressure augmented amount.

If a problem develops then the control pressure valve 150 is closed and the blow off pressure valve 152 is opened and the cavity 140 is depressurized. The pressure within the cavity pressure CP is lowered by blowing off or bleeding air out of the cavity 140 to a pressure sink or a low pressure source which may be located outside the compressor, typically ambient pressure, and depressurizing stops when the blow off pressure valve 152 is closed.

Figure 5:
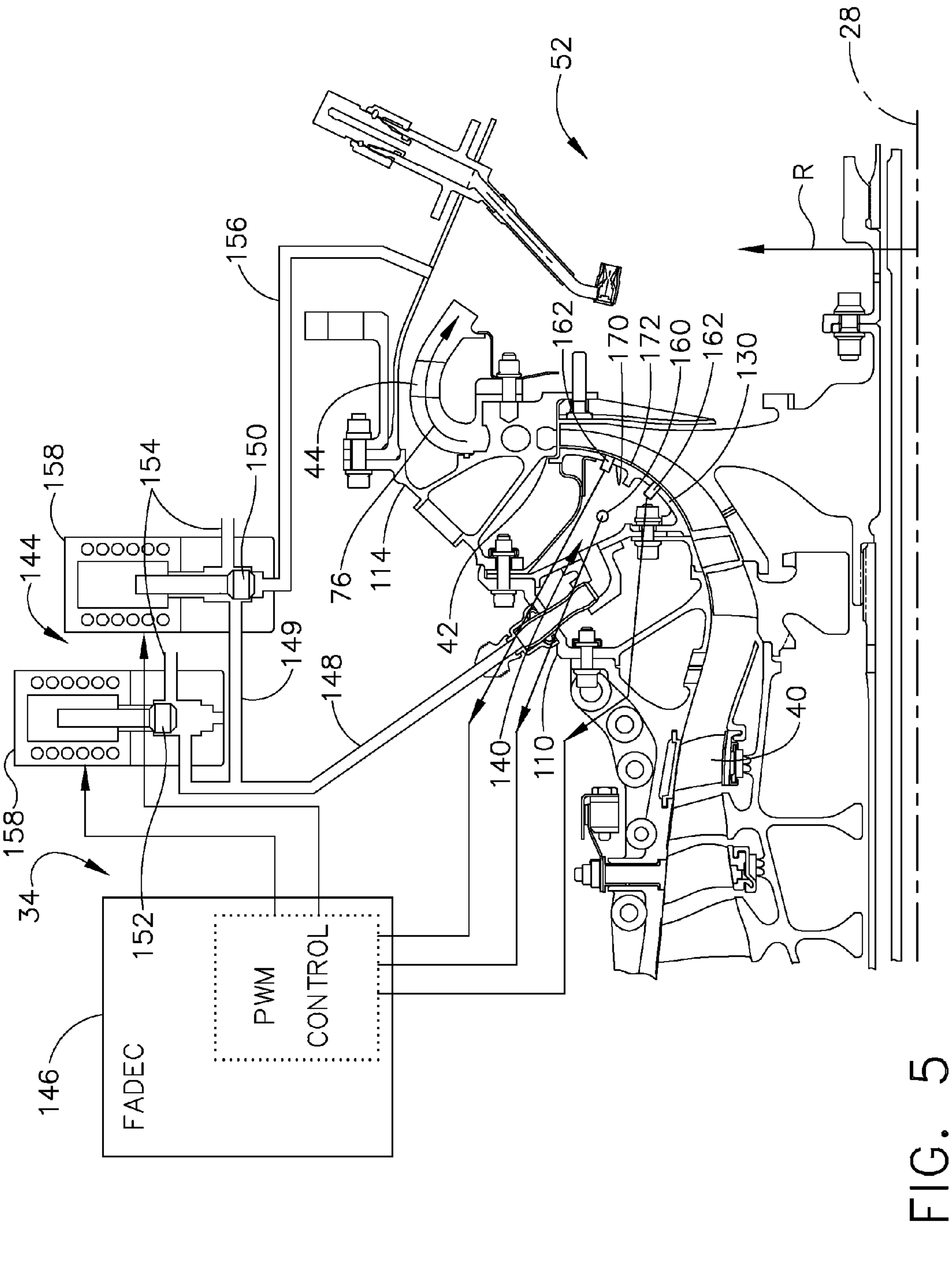
FIG. 5 is a schematic and sectional illustration of the centrifugal compressor and an alternative active clearance control system using two valves.
Figure 6:
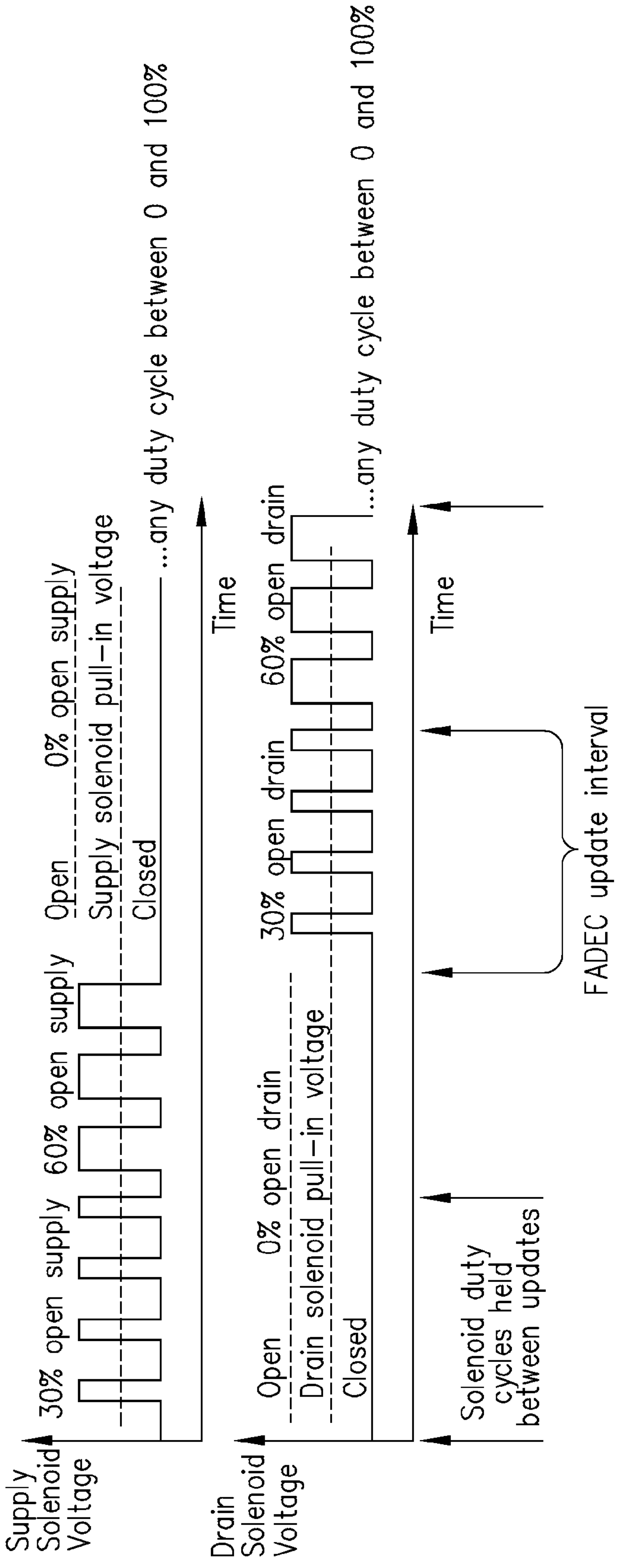
FIG. 6 is a graphic illustration of logic for operating pulse width modulation valves in the active clearance control system illustrated in FIG. 6.

An alternative exemplary embodiment of the active control system 34 is illustrated in FIGS. 5 and 6. The cavity pressure CP in the cavity 140 using the valving 144 is controlled by the electronic controller 146 to pressurize the cavity 140 with the CDP air 76 discharged from the impeller 32. The valving 144 utilizes a two way supply pressure valve 150 operating in parallel with a two way blow off pressure valve 152 which supplies CDP pressure from a pressure line 156 to the cavity 140 from the combustor 52. The supply pressure valve 150 is used to increase the cavity pressure CP in the cavity 140 with pressure of the CDP air 76 and the blow off pressure valve 152 is used to decrease the cavity pressure CP in the cavity 140.

Operation of the supply and blow off pressure valves 150, 152 are controlled by the electronic controller 146 which can be part of an electronic engine controller such as a full authority digital engine control (FADEC). The electronic controller 146 connected to the supply and blow off pressure valves 150, 152 and operable for signalling valves to open and close. The electronic controller 146 may use input from one or more pressure sensors 160 positioned for measuring the cavity pressure CP and one or more clearance sensors 162 positioned for measuring the blade tip clearance 180 between the shroud 130 and the blade tips 127 of the blades 126. The supply and blow off pressure valves 150, 152 may be electrically powered by solenoids 158 in the valves as illustrated herein. The electronic controller 146 pulses the solenoids 158 of the supply and blow off pressure valves 150, 152 many times a second so as to rapidly cycle between open and closed states. When the supply pressure valve 150 is open, the cavity 140 is pressurized and the pressure within the cavity pressure CP is increased using CDP air 76 pressure and pressurizing stops when the supply pressure valve 150 is closed. When blow off pressure valve 152 is open, the cavity 140 is depressurized and the pressure within the cavity pressure CP is lowered by blowing off or bleeding air out of the cavity 140 to a pressure sink or a low pressure source which may be located outside the compressor, typically ambient pressure, and depressurizing stops when the blow off pressure valve 152 is closed.

Referring to FIG. 6, pulse width modulation (PWM) is used by electronic controller 146 to control pulsing the solenoids 158 of the control and blow off pressure valves 150, 152 many times a second so as to rapidly cycle between open and closed states. Frequency of voltage pulses applied to the solenoids 158 is kept constant during a duty cycle but may be varied during different duty cycles depending on engine operating conditions such as take off, landing, and cruise. The amount of pressure by which the cavity 140 is pressurized or depressurized is a non-linear function of the duty cycle (i.e., the ratio of time that current is applied to the solenoid to the period) and the pressure differential across the valve. Although pulse width modulation, wherein the pulse frequency is held constant and only the pulse width is varied, is the exemplary method of operation illustrated herein, pulse ratio modulation, wherein both pulse width and frequency are variables, may also be employed.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A gas turbine engine centrifugal compressor and active control system assembly comprising:

a centrifugal compressor having a plurality of centrifugal compressor blades mounted on an annular centrifugal compressor impeller, an annular blade tip shroud adjacent to blade tips of the blades, a substantially sealed annular cavity bounded in part by the annular blade tip shroud, and an active control system for controlling an annular blade tip clearance between the annular blade tip shroud and the blade tips by controlling a cavity pressure in the cavity.

2. An assembly as claimed in claim 1, further comprising valving controlled by an electronic controller for pressurizing and depressurizing the cavity.

3. An assembly as claimed in claim 2, further comprising the valving operably connected to a source of compressor discharge pressure air for pressurizing the cavity.

4. An assembly as claimed in claim 3, further comprising the valving including a control pressure valve for pressurizing the cavity and depressurizing the cavity.

5. An assembly as claimed in claim 4, further comprising the control pressure valve being connected to the cavity, the source of compressor discharge pressure air, and a vent line.

6. An assembly as claimed in claim 4, further comprising an electronic controller controllably connected to the control pressure valve.

7. An assembly as claimed in claim 6, further comprising the electronic controller being operable for pulsing a solenoid of the control pressure valve many times a second for rapidly cycling the control pressure valve between open and closed states of the control pressure valve.

8. An assembly as claimed in claim 7, further comprising the electronic controller being operable for controlling the pulsing of the solenoid using pulse width modulation.

9. An assembly as claimed in claim 2, further comprising:

one or more pressure sensors positioned for measuring the cavity pressure, one or more clearance sensors positioned for measuring the blade tip clearance, and the pressure and clearance sensors in signal supply communication with the electronic controller.

10. An assembly as claimed in claim 9, further comprising the valving operably connected to a source of compressor discharge pressure air for pressurizing the cavity.

11. An assembly as claimed in claim 10, further comprising the valving including a control pressure valve for pressurizing and depressurizing the cavity.

12. An assembly as claimed in claim 11, further comprising the control pressure valve being connected to the cavity, the source of compressor discharge pressure air, and a vent line.

13. An assembly as claimed in claim 11, further comprising an electronic controller controllably connected to the control pressure valve.

14. An assembly as claimed in claim 13, further comprising the electronic controller being operable for pulsing a solenoid of the control pressure valve many times a second for rapidly cycling the control pressure valve between open and closed states of the control pressure valve.

15. An assembly as claimed in claim 14, further comprising the electronic controller being operable for controlling the pulsing of the solenoid using pulse width modulation.

16. An assembly as claimed in claim 1, further comprising:

the shroud being supported by radially spaced apart annular impeller shroud radially outer and inner supports connected to a casing, the cavity being bounded by the outer and inner supports and the annular blade tip shroud, and the radially outer and inner supports attached to radially outer and inner ends of the shroud respectively.

17. An assembly as claimed in claim 16, further comprising the radially outer and inner supports connected to the casing by a bolted joint.

18. An assembly as claimed in claim 17, further comprising axial stop pads extending radially outwardly from the radially outer end of and distributed circumferentially about the shroud the stop pads.

19. An assembly as claimed in claim 17, further comprising valving controlled by an electronic controller for pressurizing and depressurizing the cavity.

20. An assembly as claimed in claim 19, further comprising the valving operably connected to a source of compressor discharge pressure air for pressurizing the cavity.

21. An assembly as claimed in claim 20, further comprising the valving including a control pressure valve for pressurizing and depressurizing the cavity.

22. An assembly as claimed in claim 21, further comprising the control pressure valve being connected to the cavity, the source of compressor discharge pressure air, and a vent line.

23. An assembly as claimed in claim 21, further comprising an electronic controller controllably connected to the control and blow off pressure valves.

24. An assembly as claimed in claim 23, further comprising the electronic controller being operable for pulsing a solenoid of the control pressure valve many times a second for rapidly cycling the valves between open and closed states of the control pressure valve.

25. An assembly as claimed in claim 24, further comprising the electronic controller being operable for controlling the pulsing of the solenoid using pulse width modulation.

26. An assembly as claimed in claim 19, further comprising:

one or more pressure sensors positioned for measuring the cavity pressure, one or more clearance sensors positioned for measuring the blade tip clearance, and the pressure and clearance sensors in signal supply communication with the electronic controller.

27. An assembly as claimed in claim 26, further comprising the valving operably connected to a source of compressor discharge pressure air for pressurizing the cavity.

28. An assembly as claimed in claim 27, further comprising the valving including a control pressure valve for pressurizing and depressurizing the cavity.

29. An assembly as claimed in claim 28, further comprising the control pressure valve being connected to the cavity, the source of compressor discharge pressure air, and a vent line.

30. An assembly as claimed in claim 28, further comprising an electronic controller controllably connected to the control pressure valve.

31. An assembly as claimed in claim 30, further comprising the electronic controller being operable for pulsing a solenoid of the control pressure valve many times a second for rapidly cycling the valves between open and closed states of the control pressure valve.

32. An assembly as claimed in claim 31, further comprising the electronic controller being operable for controlling the pulsing of the solenoid using pulse width modulation.

33. An assembly as claimed in claim 3, further comprising the valving including a control pressure valve for pressurizing the cavity and a blow off pressure valve for depressurizing the cavity.

34. An assembly as claimed in claim 33, further comprising the control and blow off pressure valves being inline and connected to a pressure line extending between the cavity and the source of compressor discharge pressure air.

35. An assembly as claimed in claim 34, further comprising an electronic controller controllably connected to the control and blow off pressure valves.

36. An assembly as claimed in claim 35, further comprising the electronic controller being operable for pulsing solenoids of the control and blow off pressure valves many times a second for rapidly cycling the valves between open and closed states.

37. An assembly as claimed in claim 36, further comprising the electronic controller being operable for controlling the pulsing of the solenoids using pulse width modulation.

38. An assembly as claimed in claim 37, further comprising:

one or more pressure sensors positioned for measuring the cavity pressure, one or more clearance sensors positioned for measuring the blade tip clearance, and the pressure and clearance sensors in signal supply communication with the electronic controller.

39. An assembly as claimed in claim 33, further comprising:

the shroud being supported by radially spaced apart annular impeller shroud radially outer and inner supports connected to a casing, the cavity being bounded by the outer and inner supports and the annular blade tip shroud, and the radially outer and inner supports attached to radially outer and inner ends of the shroud respectively.

40. An assembly as claimed in claim 39, further comprising the radially outer and inner supports connected to the casing by a bolted joint.

41. An assembly as claimed in claim 40, further comprising axial stop pads extending radially outwardly from the radially outer end of and distributed circumferentially about the shroud the stop pads.

42. An assembly as claimed in claim 40, further comprising valving controlled by an electronic controller for pressurizing and depressurizing the cavity.

43. An assembly as claimed in claim 42, further comprising the valving including a control pressure valve connected to a source of compressor discharge pressure air for pressurizing the cavity and a blow off pressure valve for depressurizing the cavity.

44. An assembly as claimed in claim 43, further comprising an electronic controller controllably connected to the control and blow off pressure valves.

45. An assembly as claimed in claim 44, further comprising the electronic controller being operable for pulsing solenoids of the control and blow off pressure valves many times a second for rapidly cycling the valves between open and closed states.

46. An assembly as claimed in claim 45, further comprising the electronic controller being operable for controlling the pulsing of the solenoids using pulse width modulation.

47. A method for controlling an annular blade tip clearance between an annular blade tip shroud and adjacent blade tips mounted on an annular centrifugal compressor impeller of a gas turbine engine centrifugal compressor and active control system, the method comprising controlling a cavity pressure in a cavity bounded in part by the annular blade tip shroud.

48. A method as claimed in claim 47 further comprising using valving connected to a source of compressor discharge pressure air for increasing the cavity pressure in the cavity.

49. A method as claimed in claim 48, further comprising using a control pressure valve for the increasing and the decreasing of the cavity pressure in the cavity.

50. A method as claimed in claim 49, further comprising using an electronic controller for controlling the control pressure valve for the controlling of the cavity pressure.

51. A method as claimed in claim 50, further comprising opening the control pressure valve for pressurizing the cavity with the source of compressor discharge pressure and venting the control pressure valve for depressurizing the cavity with a pressure sink.

52. A method as claimed in claim 51, further comprising pulsing a solenoid in the control pressure valve for opening and closing the control pressure valve many times a second for rapidly cycling the control pressure valve between open and closed states of the control pressure valve for the controlling of the cavity pressure.

53. A method as claimed in claim 52, further comprising using pulse width modulation for the pulsing of the solenoid.

54. A method as claimed in claim 50, further comprising:

measuring the cavity pressure using one or more pressure sensors positioned for measuring the cavity pressure and in signal supply communication with the electronic controller, measuring the blade tip clearance using one or more clearance sensors positioned for measuring the blade tip clearance and in signal supply communication with the electronic controller, and using output from the pressure and clearance sensors to the electronic controller for further controlling the control pressure valve for the controlling of the cavity pressure.

55. A method as claimed in claim 54, further comprising opening the control pressure valve for pressurizing the cavity with the source of compressor discharge pressure and venting the control pressure valve for depressurizing the cavity with a pressure sink.

56. A method as claimed in claim 55, further comprising pulsing a solenoid in the control pressure valve for opening and closing the control pressure valve many times a second for rapidly cycling the control pressure valve between open and closed states of the control pressure valve for the controlling of the cavity pressure.

57. A method as claimed in claim 56, further comprising using pulse width modulation for the pulsing of the solenoid.

* * * * *